US008274969B2

(12) United States Patent
Wu

(10) Patent No.: US 8,274,969 B2
(45) Date of Patent: Sep. 25, 2012

(54) METHOD FOR IMPROVING RANDOM ACCESS PROCEDURE IN WIRELESS COMMUNICATIONS SYSTEM AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 78 days.

(21) Appl. No.: 12/330,526

(22) Filed: Dec. 9, 2008

(65) Prior Publication Data
US 2010/0111067 A1  May 6, 2010

Related U.S. Application Data

(60) Provisional application No. 61/109,936, filed on Oct. 31, 2008.

(51) Int. Cl.
H04L 12/66 (2006.01)
(52) U.S. Cl. .......................................... 370/354; 370/348
(58) Field of Classification Search .................. 370/328, 370/329, 310, 350, 348, 389, 280, 282; 455/450, 455/452.1, 454, 455, 502, 507
See application file for complete search history.

(56) References Cited

U.S. PATENT DOCUMENTS

| 2008/0010578 | A1* | 1/2008 | Jiang ............................. 714/748 |
| 2008/0310396 | A1* | 12/2008 | Park et al. ...................... 370/350 |
| 2009/0046713 | A1* | 2/2009 | Teague et al. .................. 370/389 |
| 2009/0143074 | A1* | 6/2009 | Pelletier et al. ............ 455/452.2 |
| 2009/0232076 | A1* | 9/2009 | Kuo ............................... 370/329 |
| 2009/0262681 | A1* | 10/2009 | Park et al. ...................... 370/328 |
| 2009/0274077 | A1* | 11/2009 | Meylan et al. ................. 370/280 |
| 2009/0279495 | A1* | 11/2009 | Yoo ................................ 370/329 |
| 2009/0304109 | A1* | 12/2009 | Kotecha ........................ 375/299 |
| 2010/0061361 | A1* | 3/2010 | Wu ................................ 370/350 |
| 2010/0080155 | A1* | 4/2010 | Suzuki et al. ................. 370/310 |
| 2010/0111067 | A1* | 5/2010 | Wu ................................ 370/345 |

OTHER PUBLICATIONS

3GPP, 3GPP TS 36.321 V8.3.0 Evolved Universal Terrestrial Radio Access (E-UTRA) Medium Access Control (MAC) protocol specification, Sep. 2008.
Fujitsu: "TAT expiry during RA procedure", 3GPP TSG RAN WG2 Meeting #63, R2-084479, Aug. 18-22, 2008, XP050319530, Jeju, Korea.
Ericsson: "New E-UTRA MAC test case-Maintenance of Uplink Time Alignment", 3GPP TSG-RAN WG5 Meeting #40, R5-083572, Aug. 18-22, 2008, XP050188032, Jeju Island, Korea.
Nokia Corporation, Nokia Siemens Networks : "TAT and RACH procedure", 3GPP TSG-RAN2 Meeting #63bis, R2-085005, Sep. 29-Oct. 3, 2008, XP050319978, Prague, Czech Republic.
R2, Clarifications and Corrections for HARQ operation at TAT expiry and RACH contention resolution, 3GPP TSG-RAN2 Meeting #63, R2-084765, 18th-22nd Aug. 2008, Jeju Island, Korea.
Office action mailed on May 29, 2012 for the China application No. 200910209712.3, filed Oct. 30, 2009, p. 1-6.

* cited by examiner

*Primary Examiner* — Hassan Phillips
*Assistant Examiner* — Ajay Cattungal
(74) *Attorney, Agent, or Firm* — Winston Hsu; Scott Margo

(57) ABSTRACT

A method for improving a random access procedure for a mobile device of a wireless communication system is disclosed. The method includes initiating the random access procedure, starting a time alignment timer of the mobile device when receiving a time alignment message transmitted by a base station of the wireless communication system, and controlling the random access procedure according to expiry of the time alignment timer, wherein the time alignment timer of the mobile device is used for determining a synchronization state between the mobile device and the base station and the time alignment message is utilized by the base station to update a timing advance for the mobile device.

24 Claims, 14 Drawing Sheets

US 8,274,969 B2

METHOD FOR IMPROVING RANDOM ACCESS PROCEDURE IN WIRELESS COMMUNICATIONS SYSTEM AND RELATED COMMUNICATION DEVICE

CROSS REFERENCE TO RELATED APPLICATIONS

This application claims the benefit of U.S. Provisional Application No. 61/109,936, filed on Oct. 31, 2008 and entitled "METHOD OF HANDLING AN RA PROCEDURE RELATED TO TIME ALIGNMENT TIMER IN WIRELESS COMMUNICATIONS SYSTEM AND RELATED COMMUNICATION DEVICE" the contents of which are incorporated herein.

BACKGROUND OF THE INVENTION

1. Field of the Invention

The present invention relates to a method utilized in a wireless communication scheme and related communication device, and more particularly, to a method and related communication device utilized in a wireless communication system for improving a random access procedure associated with a time alignment timer.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile devices, also referred as user equipments (UEs).

Architecture of the radio interface protocol of the LTE system includes three layers: the Physical Layer (L1), the Data Link Layer (L2), and the Network Layer (L3), wherein a control plane of L3 is a Radio Resource Control (RRC) layer, and L2 is further divided into a Packet Data Convergence Protocol (PDCP) layer, a Radio Link Control (RLC) layer and a Medium Access Control (MAC) layer.

In the LTE system, if a mobile device such as a mobile phone desires to connect to the Internet or communicate with other mobile phones via the LTE system, the mobile device firstly needs to be synchronized with a base station that serves the mobile device on uplink (UL) timing. The purpose of being synchronized with the base station is to prevent signals transmitted from the mobile device from colliding with other signals sent from other mobile devices under the coverage of the base station. In general, a time alignment timer of the mobile device is utilized for indicating whether the mobile device is synchronized with the base station on uplink timing. When the time alignment timer is running, uplink timing synchronization is still established. If the time alignment timer expires, then this indicates that the mobile device is not synchronized with the base station on uplink timing.

FIG. 1 is a diagram showing a Random Access (RA) procedure of the LTE system according to the prior art. As can be seen from FIG. 1, when a user equipment (UE) 210 initials an RA procedure, an RA preamble is transmitted from the UE 210 to the Evolved UMTS Terrestrial Radio Access Network (E-UTRAN) 220. The E-UTRAN 220 needs to transmit an RA response (RAR) corresponding to the RA preamble to the UE 210. After that, the UE 210 transmits a media access control protocol data unit (MAC PDU) for contention resolution to the E-UTRAN 220, wherein the MAC PDU usually consists of a MAC header and zero, one or more MAC Control Elements (CE). A MAC RAR usually consists of three fields: TA (Timing Advance)/UL Grant/Temporary C-RNTI.

However, it is not clear how to handle an ongoing RA procedure when a Time Alignment Timer expires. More specifically, when a Time Alignment Timer expires during an ongoing RA procedure, how to handle the unfinished ongoing RA procedure is not specified in the 3GPP specification. In addition, the 3GPP specification defines that when a Time Alignment Timer expires in a UE, the UE flushes all HARQ buffers. This makes a failure of a retransmission for a MAC PDU transmission for contention resolution when there is a HARQ NACK from the eNB, and the failure of the MAC PDU retransmission can even hang the UE, as shown in FIG. 2. In FIG. 2, a UE under RRC-CONNECTED mode with UL sync but without a UL grant is trying to initiate a UL data transmission by sending a RA preamble first to an eNB.

When a downlink (DL) data arrival occurs, the eNB can use a PDCCH (physical downlink control channel) order to request the UE to perform a RA procedure if the eNB considers that the UE no longer has uplink synchronization. Please refer to FIG. 3, where a PDCCH order for downlink data arrival is received by a UE under RRC_CONNECTED mode and an uplink transmission is initiated by the UE whose uplink timing is still synchronized. When the uplink timing of the UE is still synchronized, a time alignment timer is in a running state. Since the time alignment timer is running, PUCCH (physical uplink control channel) resource is considered available. In one case, the UE sends a scheduling request (SR) on PUCCH, but the eNB discards the SR and does not send a RAR to the UE since the uplink synchronization of the UE is considered lost. As a result, sending a SR is useless and it is wasteful of UE power in such case. After this, the UE may transmit a SRS (Sounding Reference Symbol) or a CQI (Channel Quality Indicator) according to RRC configuration. In another case, the UE fails to receive the RAR sent from the eNB and consequently triggers a SRS or a CQI to the eNB. However, without the timing advance information from the RAR, the eNB may fail to receive the SRS and CQI in both cases since the timing advance is not updated to an accurate value.

A NDI (New Data Indicator) is used for indicating whether the corresponding transmission is a new transmission or a retransmission. Each NDI is compared with the previous NDI. Please refer to FIG. 4, whereas UE under RRC_CONNECTED mode with a running time alignment timer handles a UL transmission after receiving a PDCCH order for DL data arrival. Since the time alignment timer keeps running through the steps of FIG. 4, the UE does not flush HARQ buffers and does not consider the next transmission for each process as the very first transmission. The very first transmission is a transmission with no available previous NDI. However, the NDI on PDCCH is randomly selected by the eNB. This impacts the following uplink transmission because the UE may find that the NDI on PDCCH is identical to the previous NDI and thereby performs a retransmission of data in one HARQ buffer. Any transmission after such retransmission should be a new transmission instead of a retransmission.

SUMMARY OF THE INVENTION

Therefore, the present invention provides a method for improving a random access procedure corresponding to a time alignment timer in a wireless communication system and related communication device that can avoid transmission errors.

According to an embodiment of the present invention, a method for improving a random access procedure for a mobile device of a wireless communication system is disclosed. The method includes controlling the random access procedure according to expiry of a time alignment timer used for determining a synchronization state between the mobile device and the base station.

According to an embodiment of the present invention, a communication device of a wireless communication system for improving a random access procedure is further disclosed and includes a computer readable recording medium, a processor, a communication interfacing unit and a control unit. The computer readable recording medium is used for storing program code corresponding to a process. The processor is coupled to the computer readable recording medium, and used for processing the program code to execute the process. The communication interfacing unit is used for exchanging signals with a peer communication device of the wireless communication system. The control unit is coupled to the processor and communication interfacing unit, and used for controlling the communication interfacing unit and the communication device according to processing results of the processor. The process includes controlling the random access procedure according to expiry of a time alignment timer used for determining a synchronization state between the mobile device and the base station and the time alignment message is utilized by the base station to update a timing advance for the communication device.

According to an embodiment of the present invention, a method for improving a random access procedure for a mobile device of a wireless communication system is further disclosed. The method includes mobile device configuring a time alignment timer of the mobile device to an expiry state when downlink signaling for triggering the random access procedure is received and the time alignment timer is in a running state, and according to expiry of the time alignment timer, performing a resetting process corresponding to a HARQ function and uplink resources of the mobile device.

According to an embodiment of the present invention, a communication device of a wireless communication system for improving a random access procedure is further disclosed and includes a computer readable recording medium, a processor, a communication interfacing unit and a control unit. The computer readable recording medium is used for storing program code corresponding to a process. The processor is coupled to the computer readable recording medium, and used for processing the program code to execute the process. The communication interfacing unit is used for exchanging signals with a peer communication device of the wireless communication system. The control unit is coupled to the processor and communication interfacing unit, and used for controlling the communication interfacing unit and the communication device according to processing results of the processor. The process includes configuring a time alignment timer of the communication device to an expiry state when downlink signaling for triggering the random access procedure is received and the time alignment timer is in a running state, and according to expiry of the time alignment timer, performing a resetting process corresponding to a HARQ function and uplink resources of the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
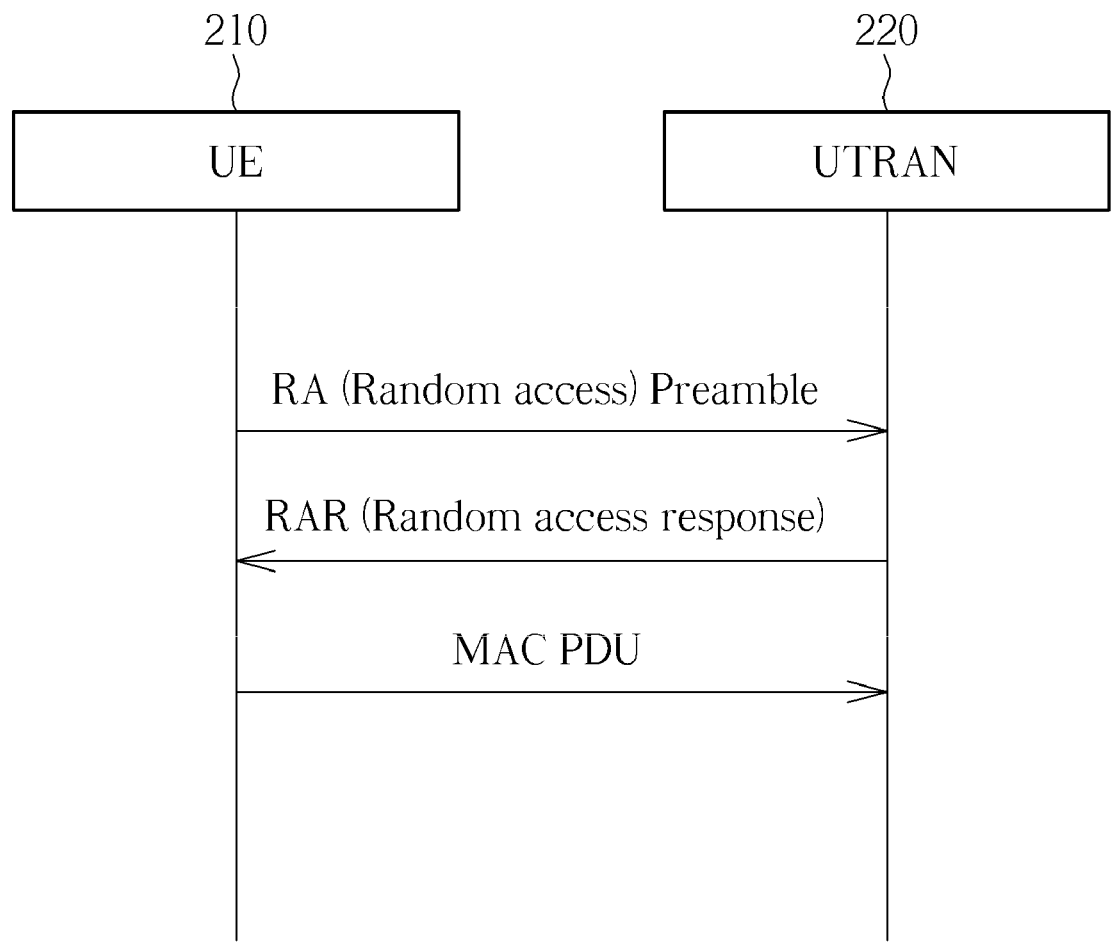
FIG. 1 is a diagram illustrating a RA procedure of the LTE system according to the prior art.
Figure 2:
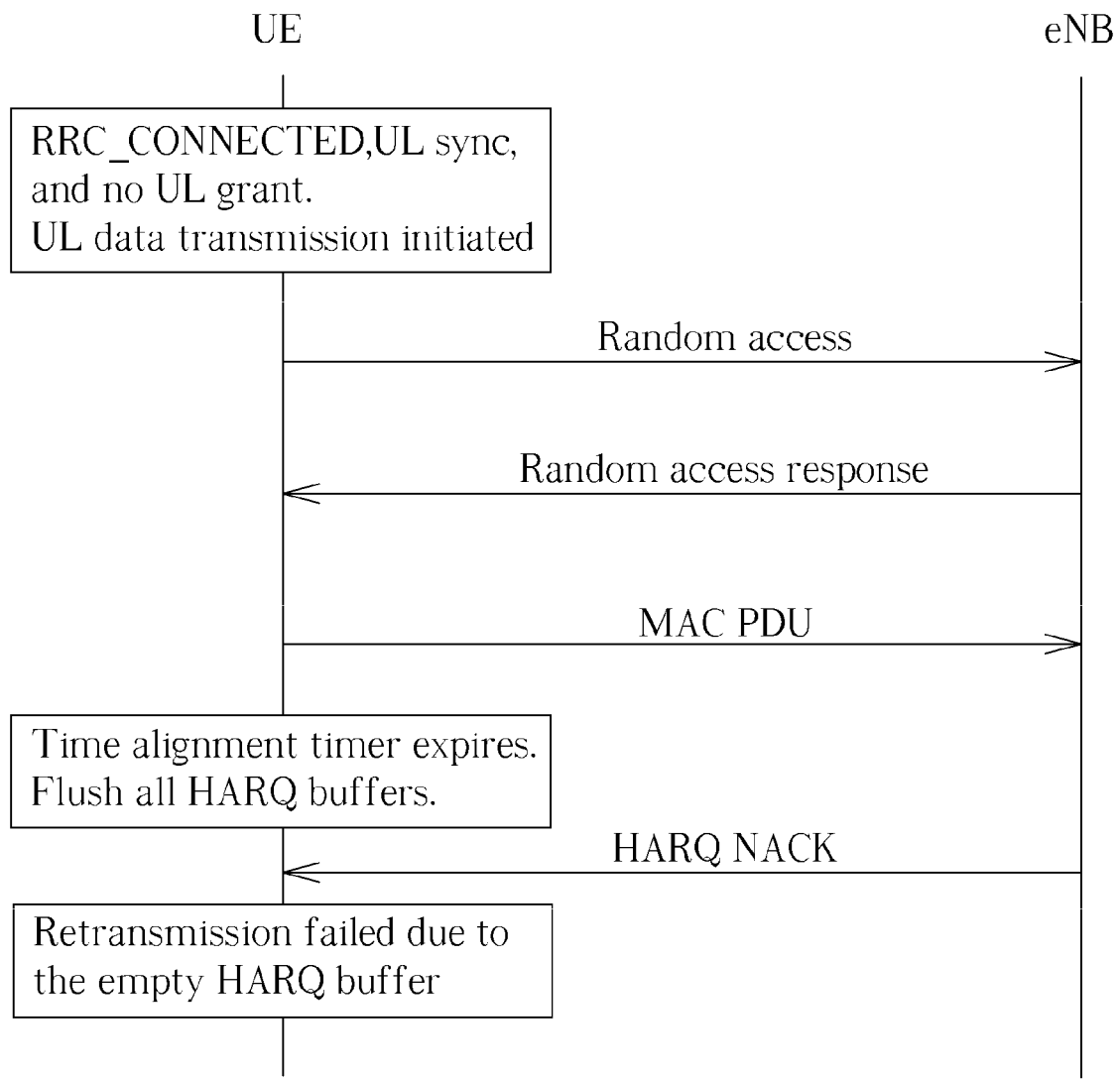
FIG. 2 is a flowchart illustrating a problem of a RA procedure when a time alignment timer expires according to the prior art.
Figure 3:
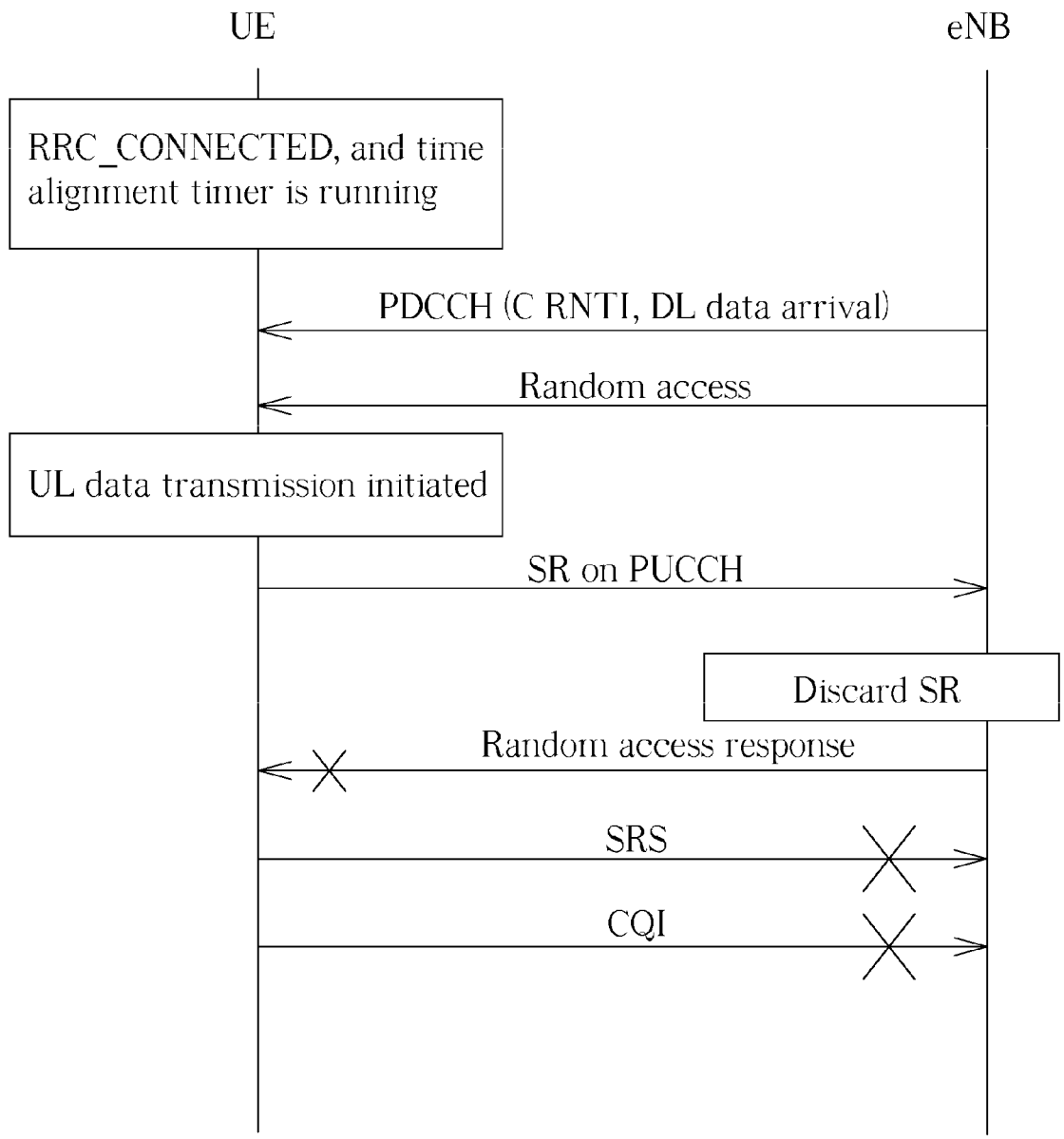
FIG. 3 is a flowchart illustrating a problem of a UE handling a UL transmission after receiving a PDCCH order for DL data arrival while a time alignment timer is in a running state according to the prior art.
Figure 4:
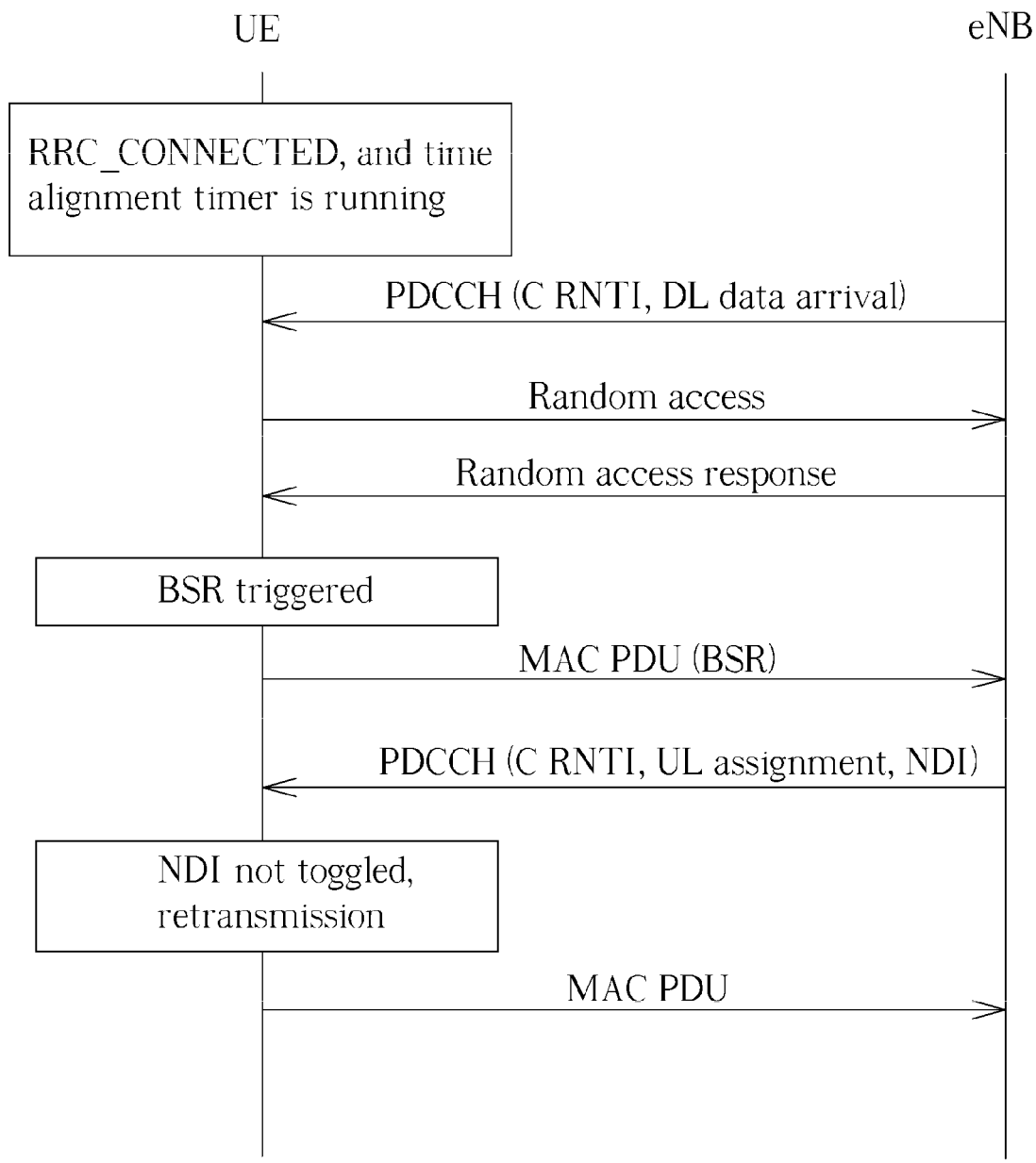
FIG. 4 is a flowchart illustrating another problem of a UE handling a UL transmission after receiving a PDCCH order for DL data arrival while a time alignment timer is in a running state according to the prior art.
Figure 5:
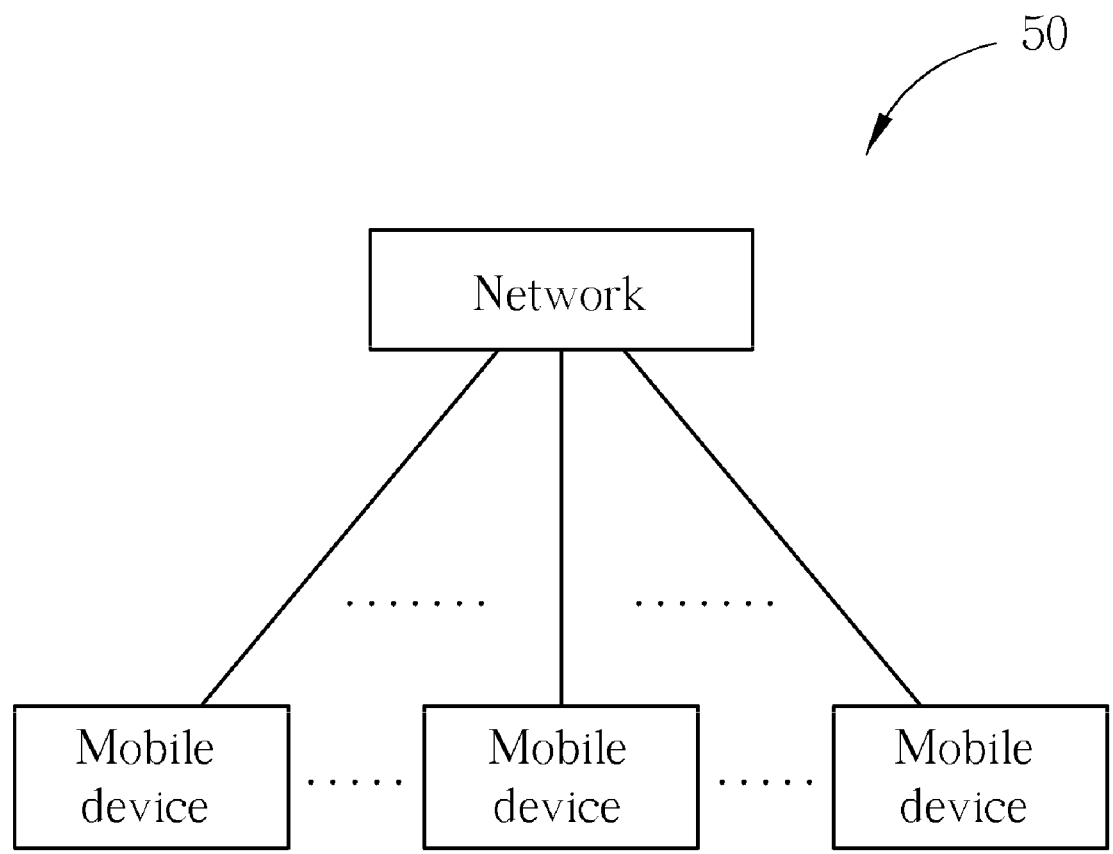
FIG. 5 is a schematic diagram of a wireless communication system.

Please refer to FIG. 5, which illustrates a schematic diagram of a wireless communication system 50 according to an embodiment of the present invention. Briefly, the wireless communication system 50 is composed of a network and a plurality of mobile devices. In FIG. 5, the network and the mobile devices are simply utilized for illustrating the structure of the wireless communication system 50. Preferably, the wireless communication system 50 is an LTE (long-term evolution) system. In the LTE system, the network is referred as an EUTRAN (evolved-UTRAN) comprising a plurality of eNBs, whereas the mobile devices are referred as user equipments (UEs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 6:
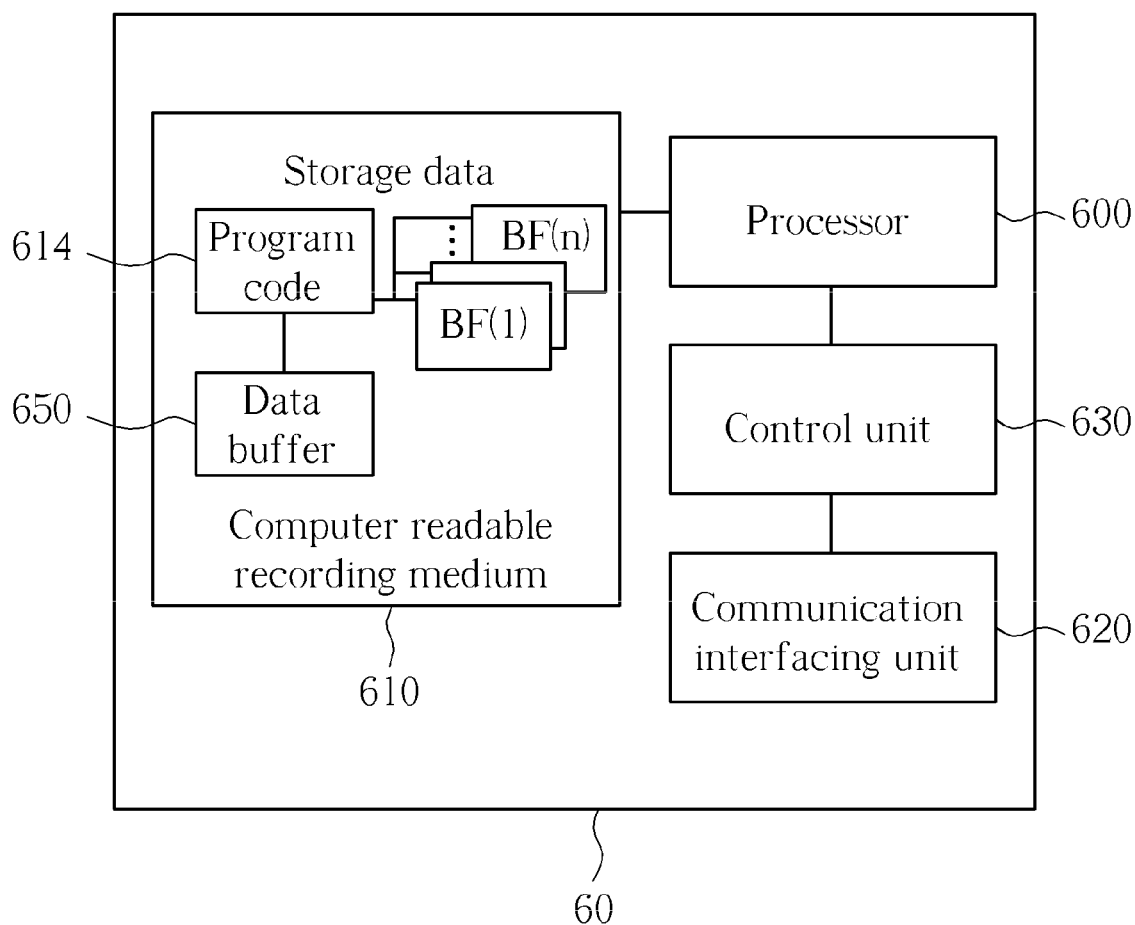
FIG. 6 is a schematic diagram of a communication device according to an embodiment of the present invention.

Please refer to FIG. 6, which illustrates a schematic diagram of a communication device 60 according to an embodiment of the present invention. The communication device 60 can be the mobile devices shown in FIG. 5 and includes a processor 600, a computer readable recording medium 610, a communication interfacing unit 620 and a control unit 630. The computer readable recording medium 610 is any data storage device that includes HARQ (Hybrid Automatic Repeat Request) buffers BF(1)-BF(n), a data buffer 650, and program code 614, thereafter read and processed by the processor 600. Examples of the computer readable recording medium 610 include a subscriber identity module (SIM), read-only memory (ROM), random-access memory (RAM), CD-ROMs, magnetic tapes, hard disks, optical data storage devices, and carrier waves (such as data transmission through the Internet). The control unit 630 controls the communication interfacing unit 620 and related operations and states of the communication device 60 according to processing results of the processor 600. The communication interfacing unit 620 is preferably a radio transceiver and accordingly exchanges wireless signals with the eNB.

Figure 7:
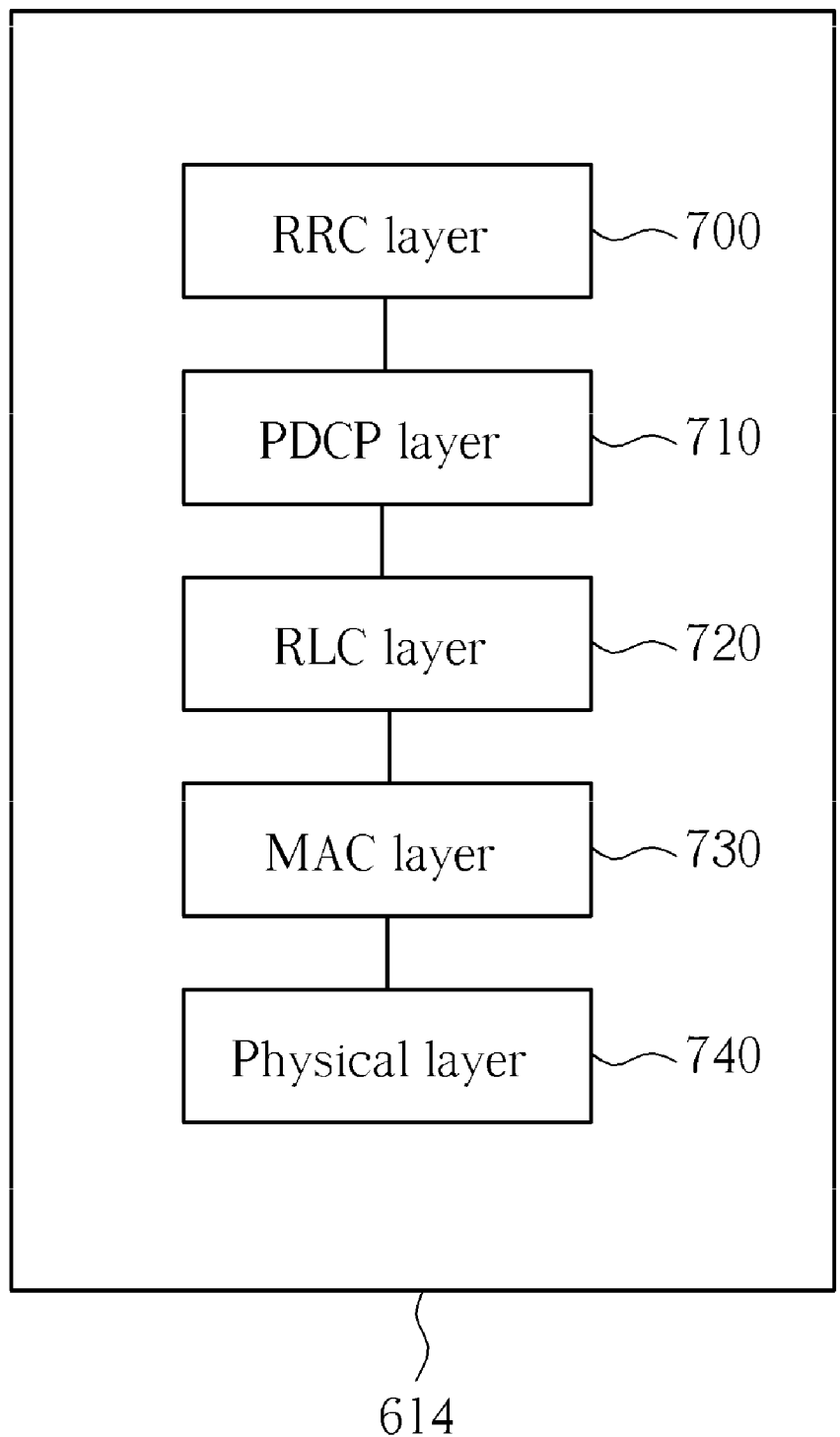
FIG. 7 is a schematic diagram of the multiple communications protocol layers of the LTE system applied by the program code of an embodiment of the present invention.

Please refer to FIG. 7, which illustrates a schematic diagram of the multiple communications protocol layers of the LTE system applied by the program code 614 according to an embodiment of the present invention. The program code 614 includes program code of multiple communications protocol layers, which from top to bottom are a radio resource control (RRC) layer 700, a packet data convergence protocol (PDCP) layer 710, a radio link control (RLC) layer 720, a medium access control (MAC) layer 730 and a physical (PHY) layer 740.

The MAC layer 730 functions for performing a random access (RA) procedure and HARQ processes HAP(1)-HAP(n) for transmission of MAC packets, i.e. MAC protocol data units (MAC PDUs). The HARQ buffers BF(1)-BF(n) are used for packet data storage of the HARQ processes HAP(1)-HAP(n), respectively. A transmission of MAC PDUs, other than a very first transmission, is determined to be a new transmission or a retransmission according to a comparison between a received new data indicator (NDI) and a previous NDI stored in corresponding HARQ buffer. The very first transmission is a transmission with no available previous NDI. In addition, the MAC layer 730 uses a time alignment timer for determining a synchronization state between the communication device 60 and the eNB on uplink timing. That is, the time alignment timer in a running state indicates that the communication device 60 is synchronized with the eNB, whereas the time alignment timer in an expiry or stop state indicates that the communication device 60 is not synchronized with the eNB. The RA procedure includes transmission of an RA preamble, reception of an RAR (random access response), and transmission of a MAC PDU for contention resolution in order. The MAC PDU for contention resolution is generated and stored in a data buffer 650 also known as a [Message3] buffer in the art. Assume that the HARQ process HAP(1) is used for transmission of the MAC PDU for contention resolution in one embodiment.

The PHY layer 740 includes a physical downlink control channel (PDCCH) for reception of downlink signaling and a physical uplink control channel (PUCCH) for transmission of uplink signaling. A SR (scheduling Request) for requesting the eNB for an uplink grant can be sent on the PUCCH. The eNB can send a PDCCH order to request the UE to perform the RA procedure.

A regular buffer status report (BSR) can be triggered in the MAC layer 730 for reporting volume of uplink packets in the PDCP layer 710 or the RLC layer 720 available to be sent to the eNB. In addition, the regular BSR can trigger a SR when the UE has no uplink resources in certain transmission opportunity. When a SR sent on PUCCH is configured, the SR is sent on PUCCH. When the SR sent on PUCCH is not configured, the MAC layer 730 needs to initiate a RA procedure for the SR.

The time alignment timer of the mobile device is used for determining whether the communication device 60 is synchronized with the eNB on uplink timing. If the time alignment timer is in a running state, the communication device 60 is determined to be synchronized with the eNB on uplink timing. If the time alignment timer is in an expiry or stop state, the communication device 60 is determined to be asynchronous with the eNB on uplink timing. In addition, a time alignment message is utilized by the eNB to update a timing advance for the communication device 60. The timing advance is well known in the art and thus description about usage of the timing advance is omitted herein. In this situation, the following processes are provided for the communication device 60 to control an on-going RA procedure according to expiry of the time alignment timer.

Figure 8:
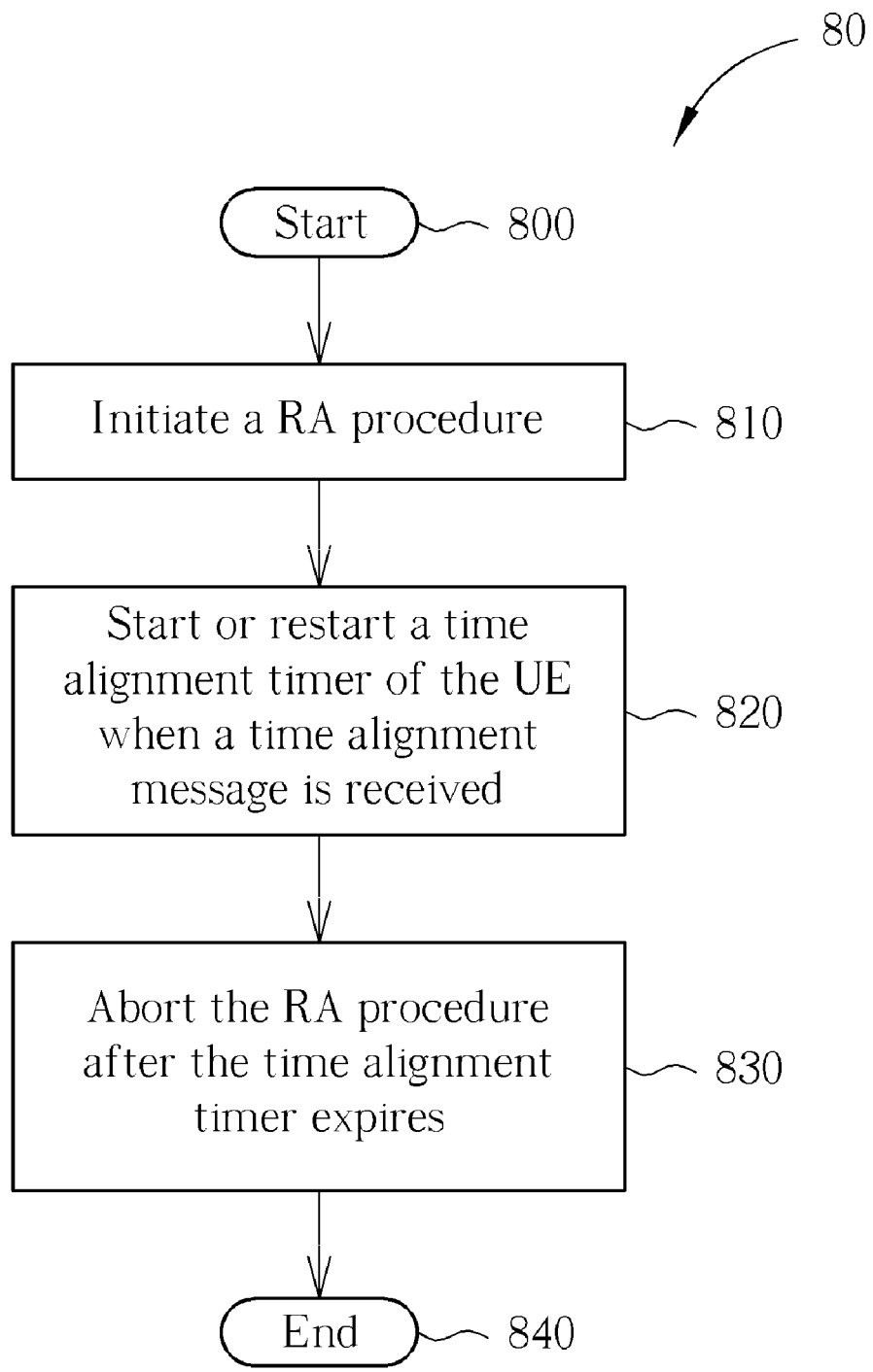
FIG. 8 is a flowchart of a process according to an embodiment of the present invention.

Please refer to FIG. 8, which illustrates a flowchart of a process 800 according to an embodiment of the present invention. The process 800 is utilized for improving a random access procedure for a UE of a wireless communication system. The process 800 can be compiled into the program code 614 and includes the following steps:

Step 800: Start.
Step 810: Initiate a RA procedure.
Step 820: Start or restart a time alignment timer of the UE when a time alignment message is received.
Step 830: Abort the RA procedure after the time alignment timer expires.
Step 840: End.

According to the process 800, the UE initiates the RA procedure and starts or restarts a time alignment timer when the time alignment message is received from the eNB. When the time alignment timer expires, this means that the UE is no longer synchronized with the eNB. However the RA procedure is still on-going and the UE may transmit packets to the eNB. Therefore, according to one embodiment of the present invention, the UE aborts the on-going RA procedure after the time alignment timer expires to avoid transmission error due to asynchronous uplink timing.

Preferably, the UE does not abort the RA procedure until a packet for contention resolution in the RA procedure is transmitted after the time alignment timer expires. The packet for contention resolution is a MAC protocol data unit (PDU) stored in the [Message3] buffer. In addition, the UE can re-initiate the RA procedure after the RA procedure is aborted.

Figure 9:
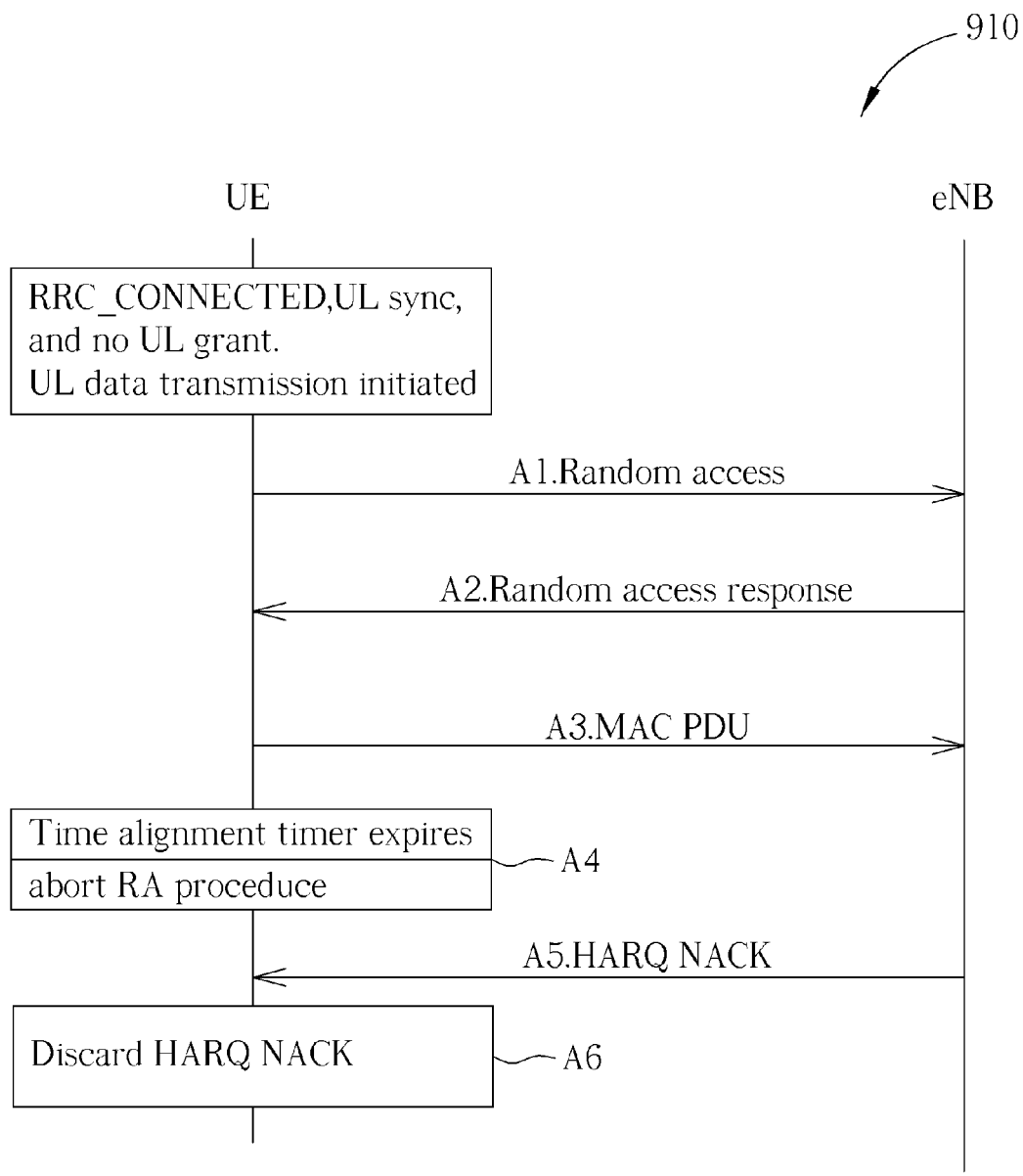
FIG. 9 is a flowchart of a process for the LTE system according to an embodiment of the present invention.

Please refer to FIG. 9, which is a flowchart of a process 900 for the LTE system according to an embodiment of the present invention. The process 900 applies the concept of the process 800. The UE, initially in a RRC_CONNECTED mode, under uplink synchronization with an eNB, has no UL grant. Since no UL grant is allocated for the UE, the UE needs to perform a RA procedure for a SR when UL data transmission is initiated. Meanwhile, a time alignment timer of the UE is assumed to have been in a running state. The UE performs steps A1-A3 during the RA procedure, and a MAC PDU for contention resolution is transmitted in step A3. Functions of the steps A1-A2 are well known in the art. In the step A4, the UE aborts the RA procedure after the time alignment timer expires. In step A5, the eNB feedbacks a negative acknowledgement (NACK) associated with the MAC PDU for contention resolution (i.e. Message 3). Since the RA procedure is aborted, the NACK is consequently discarded in step A6 according to the embodiment of the present invention. Therefore, the transmission error of the UE is avoided.

Figure 14:
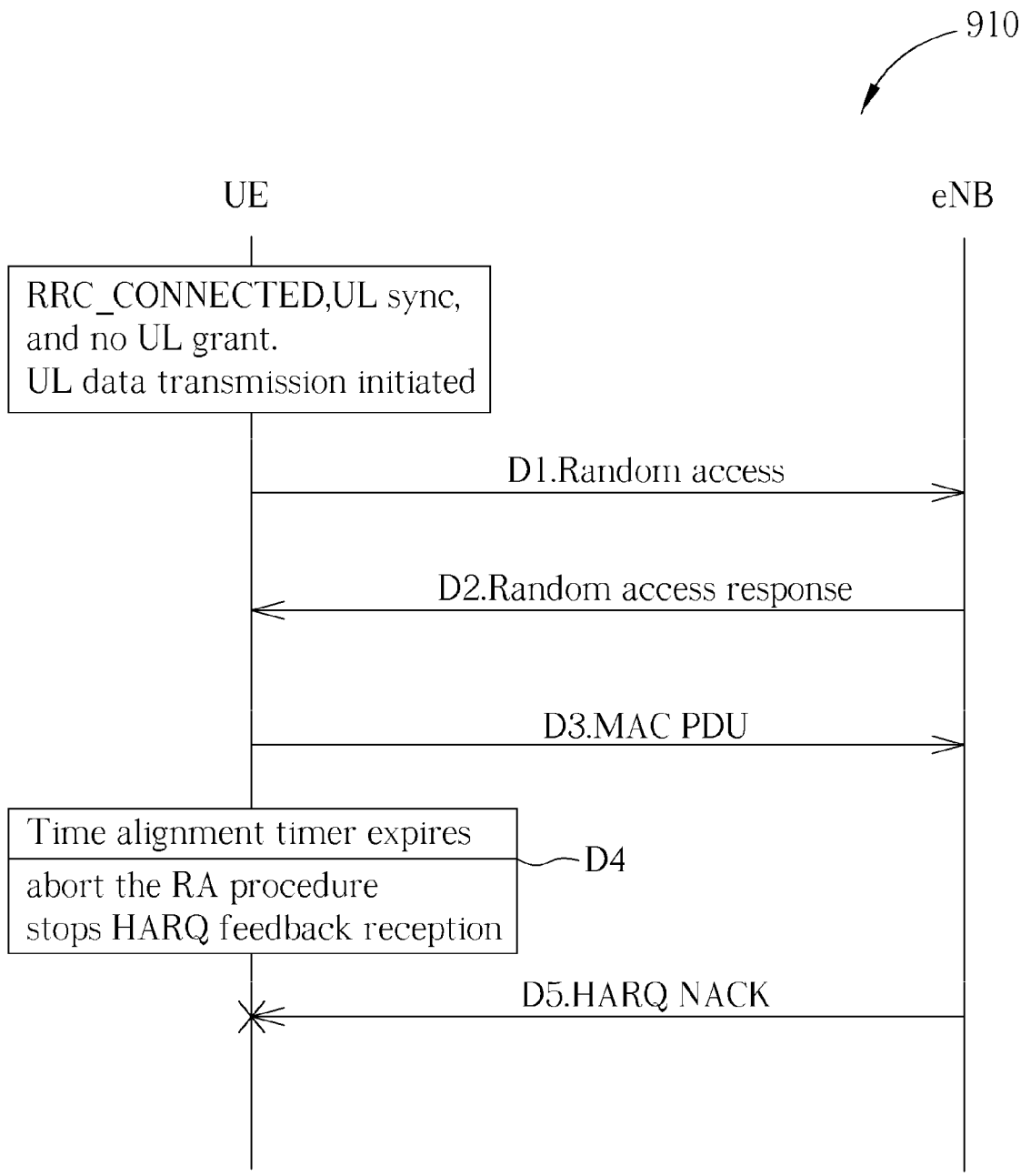
FIG. 14 is a flowchart of a process for the LTE system according to an embodiment of the present invention.

Please refer to FIG. 14, which is a flowchart of a process 910 for the LTE system according to an embodiment of the present invention. The process 910 applies the concept of the process 800. The UE, initially in an RRC_CONNECTED mode, under uplink synchronization with an eNB, has no UL grant. Since no UL grant is allocated for the UE, the UE needs to perform a RA procedure for a SR when UL data transmission is initiated. Meanwhile, a time alignment timer of the UE is assumed to have been in a running state. The UE performs steps D1-D3 during the RA procedure, and a MAC PDU for contention resolution is transmitted in step D3. the steps D1-D3 are the same as the steps A1-A3 of the process 900. In the step A4, the UE aborts the RA procedure after the time alignment timer expires and stops receiving any HARQ feedbacks, e.g. an HARQ NACK. In step A5, the eNB feedbacks an HARQ NACK associated with the MAC PDU for contention resolution (i.e. Message 3). Since the RA procedure is aborted and the HARQ feedback is stopped in step A4, the transmission error of the UE is avoided.

Figure 10:
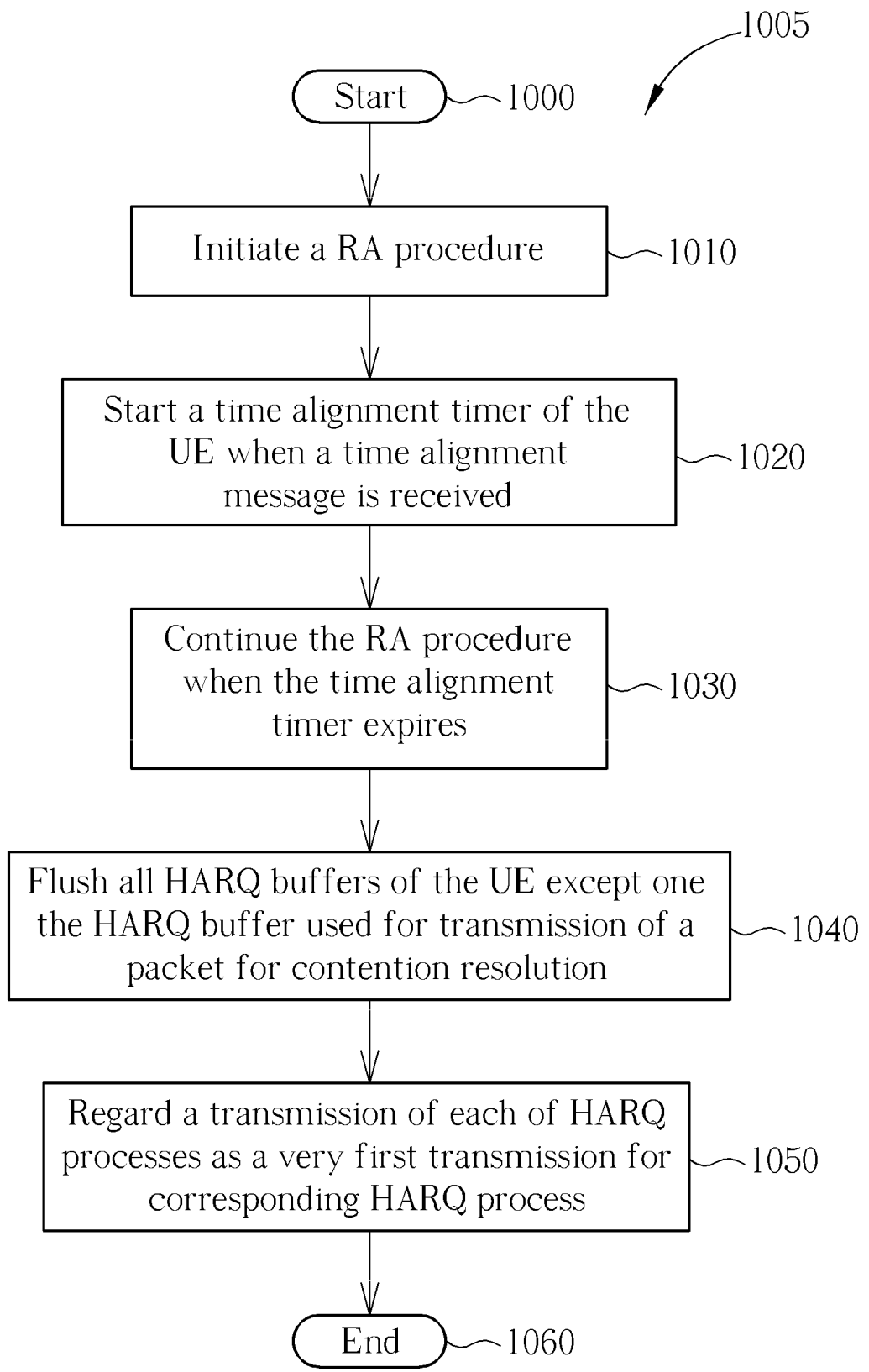
FIG. 10 is a flowchart of a process according to an embodiment of the present invention.

Please refer to FIG. 10, which illustrates a flowchart of a process 1005 according to an embodiment of the present invention. The process 1005 is utilized for improving a random access procedure for a UE of a wireless communication system. The process 1005 can be compiled into the program code 614 and includes the following steps:

Step 1000: Start.
Step 1010: Initiate a RA procedure.
Step 1020: Start a time alignment timer of the UE when a time alignment message is received.
Step 1030: Continue the RA procedure when the time alignment timer expires.
Step 1040: Flush all HARQ buffers of the UE except the HARQ buffer used for transmission of a packet for contention resolution.
Step 1050: Regard a transmission of each of HARQ processes as a very first transmission for corresponding HARQ process.
Step 1060: End.

According to the process 1005, the UE initiates the RA procedure and starts a time alignment timer when the time alignment message is received from the eNB. When the time alignment timer expires, this means that the UE is no longer synchronized with the eNB, and the UE continues the RA procedure. That is, the RA procedure is not interrupted by the UE. Then, the UE flushes all HARQ buffers except the HARQ buffer for transmission of a packet for contention resolution. After flushing the HARQ buffer, the UE regards the first transmission of each HARQ process as a very first transmission for corresponding HARQ process. For example, the UE flushes the HARQ buffers BF(2)-BF(n) except the HARQ buffers BF(1). After flushing the HARQ buffers BF(2)-BF(n), the UE regards the first transmission of HARQ processes HAP(2)-HAP(n) as the very first transmission. Through the process 1005, since no previous NDI is needed in the very first transmission, the retransmission failure corresponding to the RA procedure is avoided.

Preferably, when a random access response (RAR) of the RA procedure is received, the UE further applies a time alignment command contained in the RAR to re-start the time alignment timer. When the UE discovers that the contention resolution is unsuccessful, the UE stops the time alignment timer.

Figure 11:
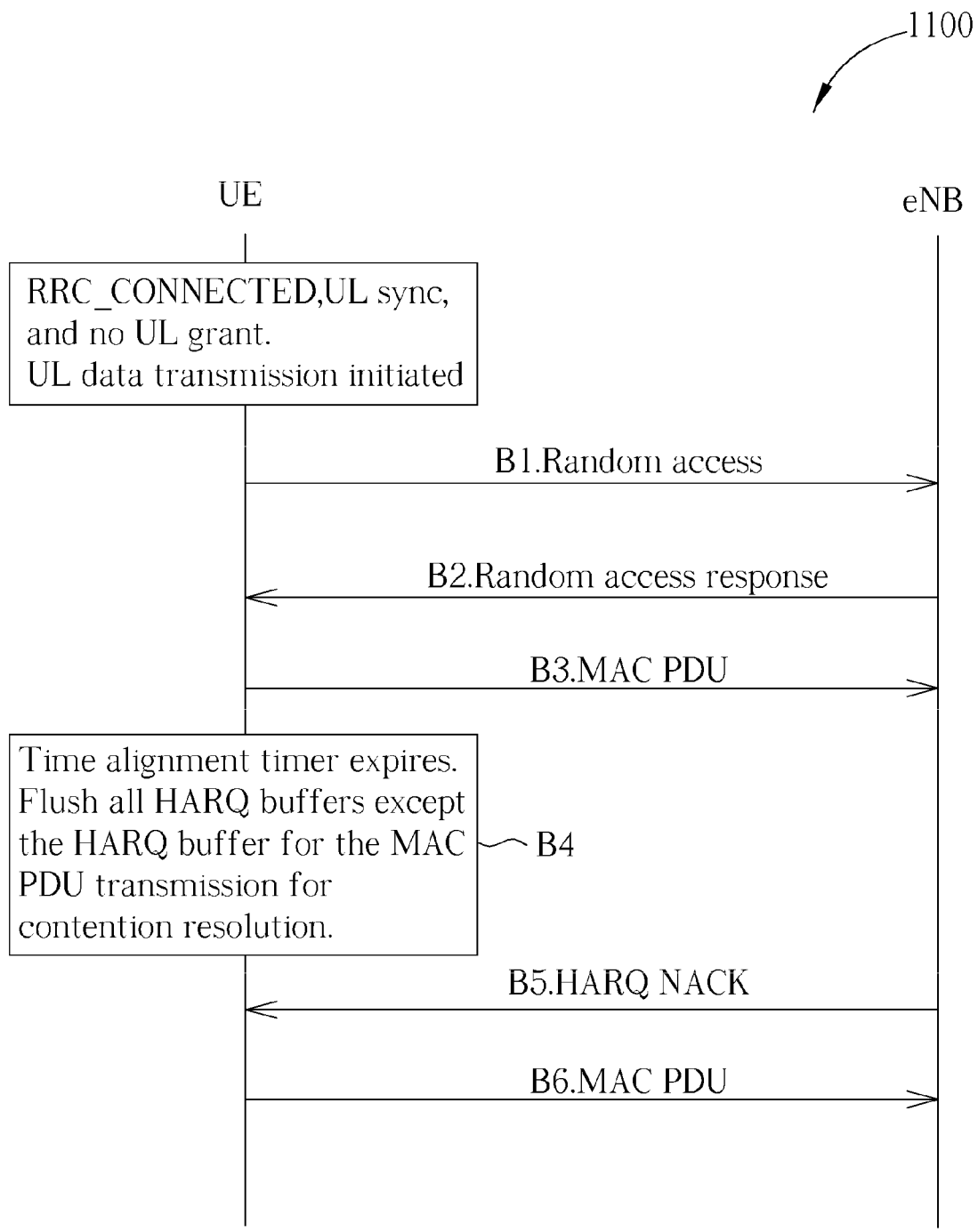
FIG. 11 is a flowchart of a process for the LTE system according to an embodiment of the present invention.

Please refer to FIG. 11, which is a flowchart of a process 1100 for the LTE system according to an embodiment of the present invention. The process 1100 applies the concept of the process 1005. The initial state of the UE and steps B1-B3 in FIG. 11 are the same as the initial state of the UE and steps A1-A3 in FIG. 9. In step B4, when the time alignment timer expires, the UE continues the RA procedure and flushes all HARQ buffers except the HARQ buffer for contention resolution. In step B5, the eNB feedbacks a NACK associated with the MAC PDU for contention resolution. In this situation, the UE is able to retransmit the MACK PDU for contention resolution since the corresponding HARQ buffer is not flushed. Thus the retransmission failure due to empty HARQ buffer is avoided.

Instead of Steps 1040 and 1050, the UE can acquire the packet for contension resolution from a data buffer used for contension resolution (e.g. the [Message3] buffer) for retransmission when the HARQ buffer responsible for transmission of the packet for contension resolution, e.g. the BF(1), is empty and a HARQ NACK associated with the packet for contension resolution or downlink signaling used for adaptive retransmission is received. The downlink signaling used for adaptive retransmission is preferable adaptive retransmission signaling sent on the PDCCH. Through the abovementioned actions, the UE is able to retransmit the packet for contension resolution by retrieving the packet from the corresponding data buffer.

Figure 12:
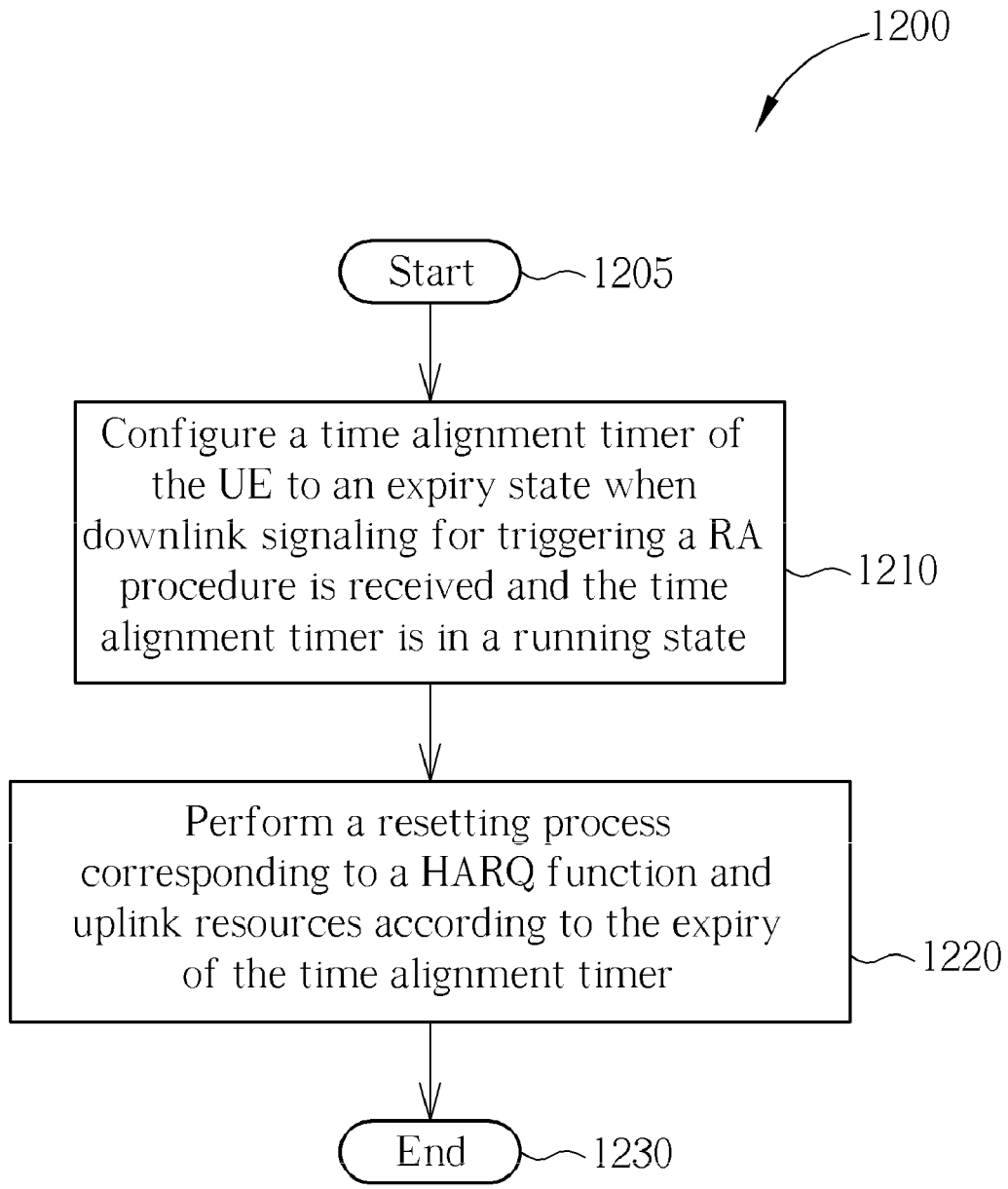
FIG. 12 is a flowchart of a process according to an embodiment of the present invention.

Please refer to FIG. 12, which illustrates a flowchart of a process 1200 according to an embodiment of the present invention. The process 1200 is utilized for improving a random access procedure for a UE of a wireless communication system. The process 1200 can be compiled into the program code 614 and includes the following steps:

Step 1205: Start.
Step 1210: Configure a time alignment timer of the UE to an expiry state when downlink signaling for triggering a RA procedure is received and the time alignment timer is in a running state.
Step 1220: Perform a resetting process corresponding to a HARQ function and uplink resources according to the expiry of the time alignment timer.
Step 1230: End.

According to the process 1200, the UE configures the time alignment timer to an expiry state when the downlink signaling for triggering a RA procedure is received and time alignment timer is in a running state. According to the expiry of the time alignment timer, the UE performs the resetting process corresponding to the HARQ function and the uplink resources, so as to avoid the following transmissions being mistakenly performed. For example, a mistaken transmission scenario, where a next transmission shall be a new transmission but the UE mistakenly performs the transmission as a retransmission, can be avoided.

Furthermore, the UE can initiate the RA procedure after the resetting process is performed. Alternatively, the UE can initiate the RA procedure when the downlink signaling is received and the time alignment timer is in the running state. In this situation, the UE further applies a time alignment command contained in a RAR of the RA procedure, and re-starts the time alignment timer according to the time alignment command.

Preferably, the downlink signaling for triggering the random access procedure is a PDCCH order and is generated due to downlink data arrival.

In the resetting process corresponding to the HARQ function, the UE flushes all the HARQ buffers when the RA procedure has not been performed, or flushes all the HARQ buffers except the HARQ buffer for transmission of a packet for contention resolution when the RA procedure is on-going. In addition, the first transmission of each HARQ process, which follows HARQ buffer flush, is regarded as a very first transmission for corresponding HARQ process. The NDIs (New Data Indicators) for the UE to determine the current transmission type of HARQ processes are reset.

In the resetting process corresponding to the uplink resources, the UE releases resources corresponding to uplink signaling and sounding reference symbols.

Figure 13:
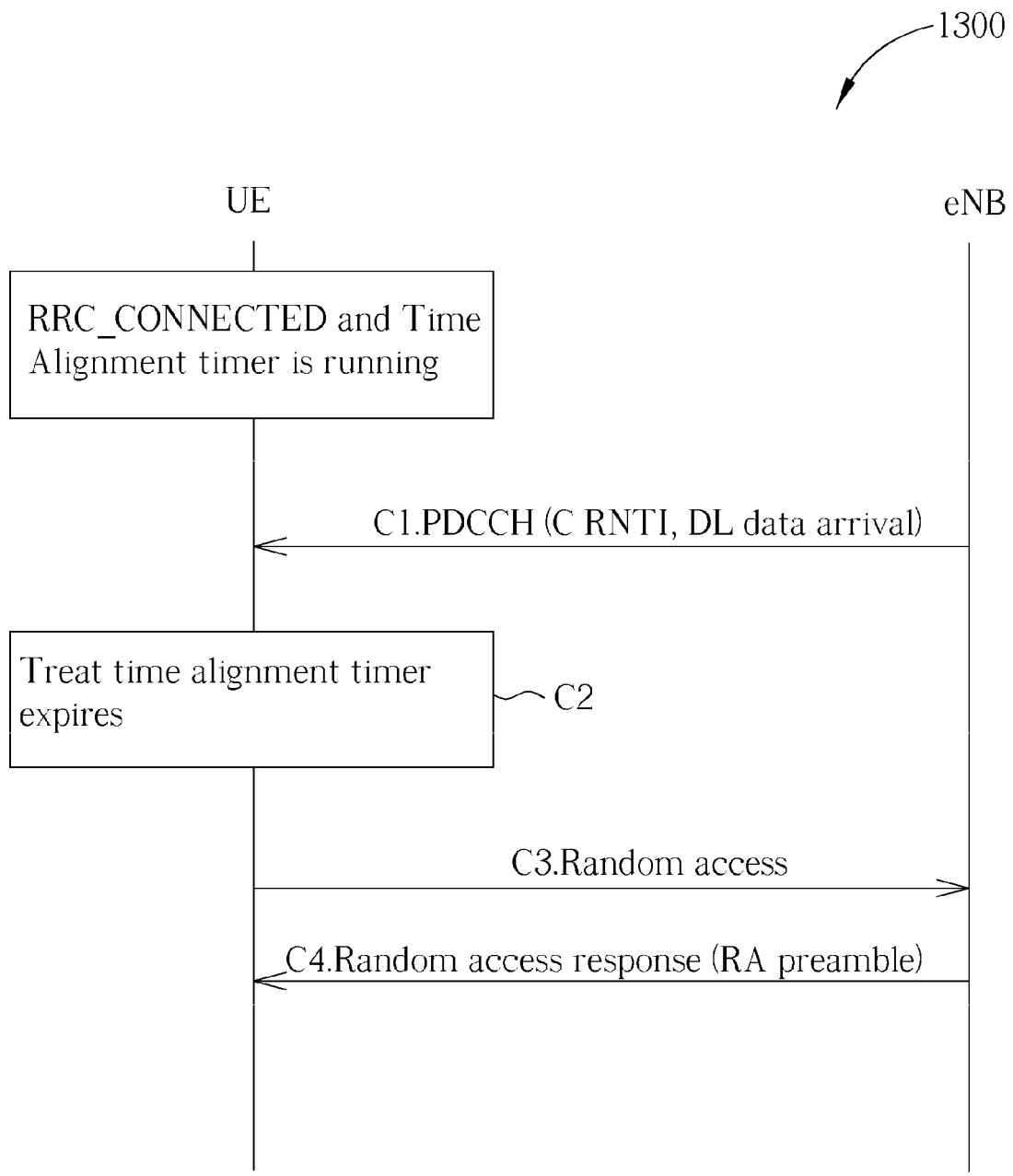
FIG. 13 is a flowchart of a process for the LTE system according to an embodiment of the present invention.

Please refer to FIG. 13, which is a flowchart of a process 1300 for the LTE system according to an embodiment of the present invention. The process 1300 applies the concept of the process 1200. Initially, the UE stays in an RRC_CONNECTED mode, and the time alignment timer is in the running state. In step C1, the UE receives downlink signaling indicating DL data arrival from the PDCCH, where the downlink signaling indicating DL data arrival is used for triggering the UE to initiate a RA procedure. In step C2, the time alignment timer expires and accordingly the UE performs the abovementioned resetting process. In this situation, the UE does not mistakenly determine an expected retransmission to be a new transmission or an expected retransmission to be a new transmission, since the NDIs are all reset. As a result, transmission errors possibly occurred in the RA procedure performed in steps C3 and C4 are avoided.

In conclusion, the above embodiments are provided for handling an ongoing RA procedure when a time alignment timer expires, and a RA procedure triggered by a PDCCH order with a running time alignment timer to avoid transmission errors in the RA procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving a random access procedure for a mobile device of a wireless communication system, the method comprising:

configuring a time alignment timer of the mobile device to an expiry state when a downlink signaling for triggering the random access procedure is received and the time alignment timer is in a running state, wherein the downlink signaling for triggering the random access procedure is a PDCCH order and is generated due to downlink data arrival; and according to the expiry of the time alignment timer, performing a resetting process corresponding to a HARQ function and uplink resources of the mobile device.

2. The method of claim 1 further comprising initiating the random access procedure after the resetting process.

3. The method of claim 1, wherein the resetting process comprises:

when the random access procedure has not been performed, flushing a plurality of HARQ buffers of the mobile device, wherein the plurality of HARQ buffers correspond to a plurality of HARQ processes;

when the random access procedure is on-going, flushing the plurality of HARQ buffers of the mobile device except one of the plurality of HARQ buffers used for transmission of a packet for contention resolution;

regarding a first transmission of each of the plurality of HARQ processes, which is performed after the plurality of HARQ buffers are flushed, as a very first transmission for corresponding HARQ process;

releasing resources corresponding to uplink signaling; and releasing resources corresponding to sounding reference symbols.

4. The method of claim 1 further comprising initiating the random access procedure when the downlink signaling for triggering the random access procedure is received and the time alignment timer is in the running state.

5. The method of claim 4 further comprising:

applying a time alignment ccommand contained in a random access response of the random access procedure; and re-starting the time alignment timer according to the time alignment command.

6. A communication device of a wireless communication system for improving a random access procedure, the communication device comprising:

a non-transitory computer readable recording medium for storing program code corresponding to a process; and a processor coupled to the computer readable recording medium, for processing the program code to execute the process;

wherein the process comprises:

configuring a time alignment timer of the communication device to an expiry state when a downlink signaling for triggering the random access procedure is received and the time alignment timer is in a running state, wherein the downlink signaling for triggering the random access procedure is a PDCCH order and is generated due to downlink data arrival; and according to an expiry of the time alignment timer, performing a resetting process corresponding to a HARQ function and uplink resources of the communication device.

7. The communication device of claim 6, wherein the process further comprises initiating the random access procedure after the resetting process.

8. The communication device of claim 6, wherein the resetting process comprises:

when the random access procedure has not been performed, flushing a plurality of HARQ buffers of the communication device, wherein the plurality of HARQ buffers correspond to a plurality of HARQ processes;

when the random access procedure is on-going, flushing the plurality of HARQ buffers except one of the plurality of HARQ buffers used for transmission of a packet for contention resolution;

using a first transmission of each of the plurality of HARQ processes, which is performed after the plurality of HARQ buffers are flushed, as a very first transmission for corresponding HARQ process;

releasing resources corresponding to uplink signaling; and releasing resources corresponding to sounding reference symbols.

9. The communication device of claim 6, wherein the process further comprises initiating the random access procedure when the downlink signaling for triggering the random access procedure is received and the time alignment timer is in the running state.

10. The communication device of claim 9, wherein the process further comprises:

applying a time alignment ccommand contained in a random access response of the random access procedure; and re-starting the time alignment timer according to the time alignment command.

11. A method for improving a random access procedure for a mobile device of a wireless communication system, the method comprising:

initiating a random access procedure;

transmitting a message 3 of the random access procedure to a network;

aborting the random access procedure after a time alignment timer expires, wherein the time alignment timer is used for indicating whether the mobile device is synchronized with a network on uplink timing; and discarding a hybrid automatic repeat request negative acknowledgement (HARQ NACK) corresponding to the message 3 of the random access procedure, when the HARQ NACK is received after the time alignment timer expires and the random access procedure is aborted.

12. A method for improving a random access procedure for a mobile device of a wireless communication system, the method comprising:
- initiating a random access procedure;
- aborting the random access procedure after a time alignment timer expires, wherein the time alignment timer is used for indicating whether the mobile device is synchronized with a network on uplink timing; and
- stopping receiving any HARQ feedback associated with the random access procedure after the time alignment timer expires and the random access procedure is aborted.

13. A method for improving a random access procedure for a mobile device of a wireless communication system, the method comprising:
- initiating a random access procedure;
- continuing the random access procedure when the time alignment timer expires; and
- flushing a plurality of HARQ buffers of the mobile device except one of the plurality of HARQ buffers used for transmission of a packet for contention resolution of the random access procedure, wherein the plurality of HARQ buffers correspond to a plurality of HARQ processes.

14. The method of claim 13 further comprising:
- regarding a first transmission of each of the plurality of HARQ processes, which follows the HARQ buffer flush, as a very first transmission for corresponding HARQ process.

15. The method of claim 13 further comprising:
- applying a time alignment command contained in a random access response of the random access procedure;
- re-starting the time alignment timer according to the time alignment command; and
- stopping the time alignment timer when the mobile device indicates that contention resolution is unsuccessful.

16. The method of claim 13 further comprising:
- acquiring a packet for contention resolution of the random access procedure from a data buffer used for contension resolution, wherein the packet for contention resolution of the random access procedure is transmitted before the time alignment timer expires; and
- transmitting the packet for retransmission when a HARQ buffer responsible for transmission of the packet is empty and a HARQ negative acknowledgement corresponding to the packet is received.

17. A method for improving a random access procedure for a mobile device of a wireless communication system, the method comprising:
- initiating a random access procedure;
- continuing the random access procedure when the time alignment timer expires;
- acquiring a packet for contention resolution of the random access procedure from a data buffer used for contention resolution, wherein the packet for contention resolution of the random access procedure is transmitted before the time alignment timer expires; and
- transmitting the packet for a retransmission when the HARQ buffer responsible for transmission of the packet is empty and downlink signaling used for adaptive retransmission of the retransmission is received.

18. A communication device of a wireless communication system for improving a random access procedure, the communication device comprising:
- a non-transitory computer readable recording medium for storing program code corresponding to a process; and
- a processor coupled to the computer readable recording medium, for processing the program code to execute the process;
- wherein the process comprises:
  - initiating a random access procedure;
  - transmitting a message 3 of the random access procedure to a network;
  - aborting the random access procedure after a time alignment timer expires, wherein he time alignment timer is used for indicating whether the mobile device is synchronized with a network on uplink timing; and
  - discarding a hybrid automatic repeat request negative acknowledgement (HARQ NACK) corresponding to the message 3 of the random access procedure, when the HARQ NACK is received after the time alignment timer expires and the random access procedure is aborted.

19. A communication device of a wireless communication system for improving a random access procedure, the communication device comprising:
- a non-transitory computer readable recording medium for storing program code corresponding to a process; and
- a processor coupled to the computer readable recording medium, for processing the program code to execute the process;
- wherein the process comprises:
  - initiating a random access procedure;
  - aborting the random access procedure after a time alignment timer expires, wherein he time alignment timer is used for indicating whether the mobile device is synchronized with a network on uplink timing; and
  - stopping receiving any HARQ feedback associated with the random access procedure after the time alignment timer expires and the random access procedure is aborted.

20. A communication device of a wireless communication system for improving a random access procedure, the communication device comprising:
- a non-transitory computer readable recording medium for storing program code corresponding to a process; and
- a processor coupled to the computer readable recording medium, for processing the program code to execute the process;
- wherein the process comprises:
  - initiating a random access procedure;
  - continuing the random access procedure when the time alignment timer expires; and
  - flushing a plurality of HARQ buffers of the mobile device except one of the plurality of HARQ buffers used for transmission of a packet for contention resolution of the random access procedure, wherein the plurality of HARQ buffers correspond to a plurality of HARQ processes.

21. The communication device of claim 20, wherein the process further comprises:
- regarding a first transmission of each of the plurality of HARQ processes, which follows the HARQ buffer flush, as a very first transmission for corresponding HARQ process.

22. The communication device of claim 20, wherein the process further comprises:
- applying a time alignment command contained in a random access response of the random access procedure;
- re-starting the time alignment timer according to the time alignment command; and
- stopping the time alignment timer when the mobile device discovers that contention resolution is unsuccessful.

23. The communication device of claim 20, wherein the process further comprises:
   acquiring a packet for contention resolution of the random access procedure from a data buffer used for contension resolution, wherein the packet for contention resolution of the random access procedure is transmitted before the time alignment timer expires; and
   transmitting the packet for retransmission when a HARQ buffer responsible for transmission of the packet is empty and a HARQ negative acknowledgement corresponding to the packet is received.

24. A communication device of a wireless communication system for improving a random access procedure, the communication device comprising:
   a non-transitory computer readable recording medium for storing program code corresponding to a process; and
   a processor coupled to the computer readable recording medium, for processing the program code to execute the process;
   wherein the process comprises:
      initiating a random access procedure;
      continuing the random access procedure when the time alignment timer expires;
      acquiring a packet for contention resolution of the random access procedure from a data buffer used for contention resolution, wherein the packet for contention resolution of the random access procedure is transmitted before the time alignment timer expires; and
      transmitting the packet for a retransmission when the HARQ buffer responsible for transmission of the packet is empty and downlink signaling used for adaptive retransmission of the retransmission is received.

* * * * *